July 20, 1965    D. C. SHERMAN    3,195,862
WINGED SHEAVE BLOCK
Filed May 31, 1962    2 Sheets-Sheet 1
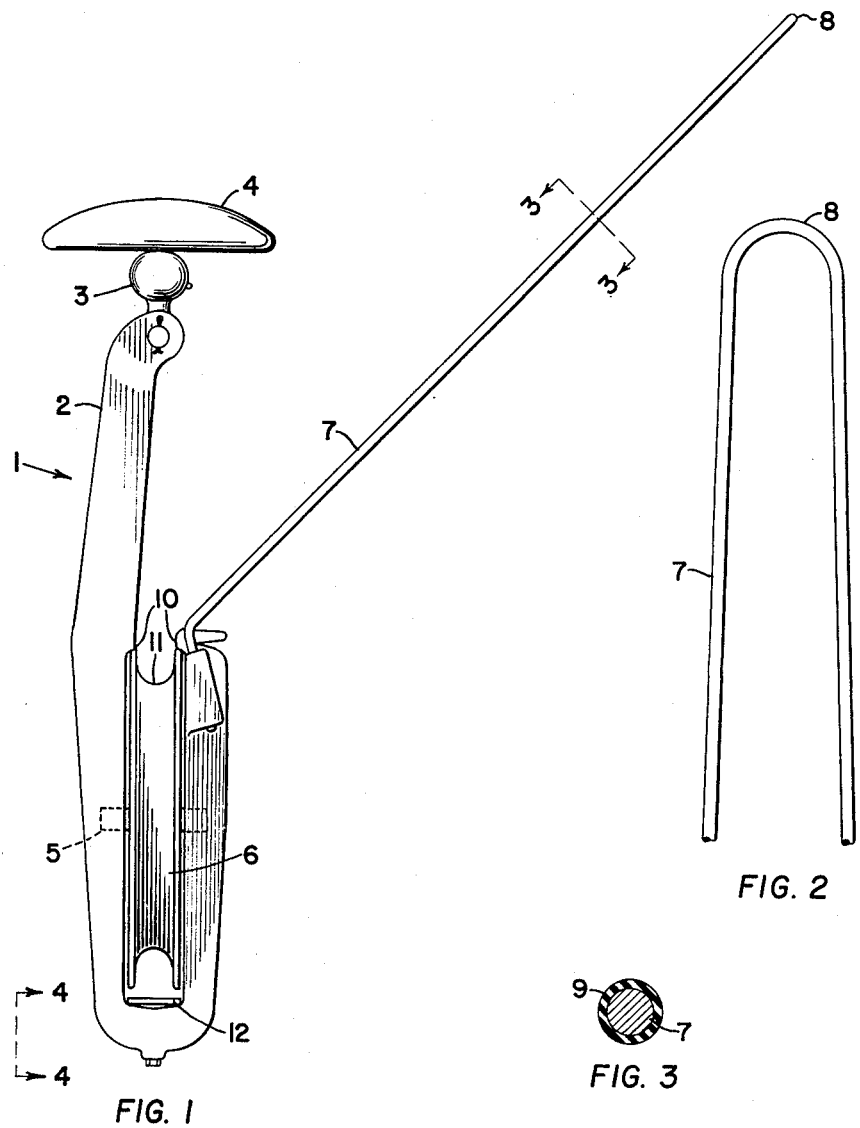
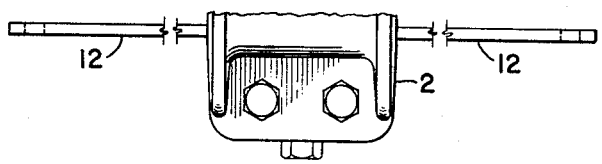
INVENTOR
DELMAR C. SHERMAN
BY
ATTORNEY July 20, 1965     D. C. SHERMAN     3,195,862
WINGED SHEAVE BLOCK Filed May 31, 1962     2 Sheets-Sheet 2

INVENTOR
DELMAR C. SHERMAN
BY
ATTORNEY

United States Patent Office 3,195,862
Patented July 20, 1965

3,195,862
WINGED SHEAVE BLOCK
Delmar C. Sherman, Chattanooga, Tenn., assignor to Sherman & Reilly, Inc., Chattanooga, Tenn., a corporation of Tennessee
Filed May 31, 1962, Ser. No. 199,014
2 Claims. (Cl. 254—197)

This invention relates to a sheave block and more particularly to such a block which is useful in striging electric power transmission lines.

In the stringing of electric power transmission lines, experiments have been conducted successfully with stringing such lines from a helicopter. It is considered that such a method may be feasible, even at the high cost of operating a helicpter. Heretofore, when stringing lines over difficult terrain, the lines have been pulled in through blocks by means of a pulling rope attached to pulling devices located on the ground. This is pulled through blocks hung from the structure which ultimately permanently support the overhead lines. Stringing of lines by helicopter is much quicker than stringing by such conventional means and has the advantage that most scratches caused in manual handling are avoided. Such scratches are very undesirable because they cause corona loss, electric interference and other undesirable results. In stringing lines by helicopter, the problem arises to provide blocks on the support tower into which the helicopter, by itself, can string the conductor, by itself, and can position the conductor into such blocks without requiring a man on each support tower and without using a wire rope, plastic rope, or the like, to pull the transmission line. For this purpose, there is needed a special type of block mounted on each support structure.

One object of my invention is to provide a block which is partially open and has an inclined wing in the form of a loop of spring metal for guiding a wire or lead rope into the sheave of the block.

Another object is to provide a block having such a wing made of metal of round cross section.

A further object is to provide a block having a wing covered with a rubbery material.

Still another object is to provide a block having a wing with a fluorescent surface to enhance its visibility.

A still further object of my invention is to provide a block the frame of which includes adjacent to the wing projections overhanging the sides of the sheave to insure proper placement of the line in the groove of the sheave.

Another object is to provide a block having a pivotal latch attached to the wing for admitting the line to the groove of the sheave and then holding it in place.

Other objects and advantages of the invention will be apparent from the following description, taken in conjunction with the accompanying drawings, in which:

FIG. 1 is a front elevation of one embodiment of my invention;

FIG. 2 is a side view, partly broken away, of a forked wing, guide or outrigger shown in FIG. 1;

FIG. 3 is an enlarged sectional view of one arm of the forked wing on the line 3—3 of FIG. 1;

FIG. 4 is an enlarged partial side elevation, partly broken away, on the line 4—4 of FIG. 1, showing a stabilizing bar;

Figure 5:
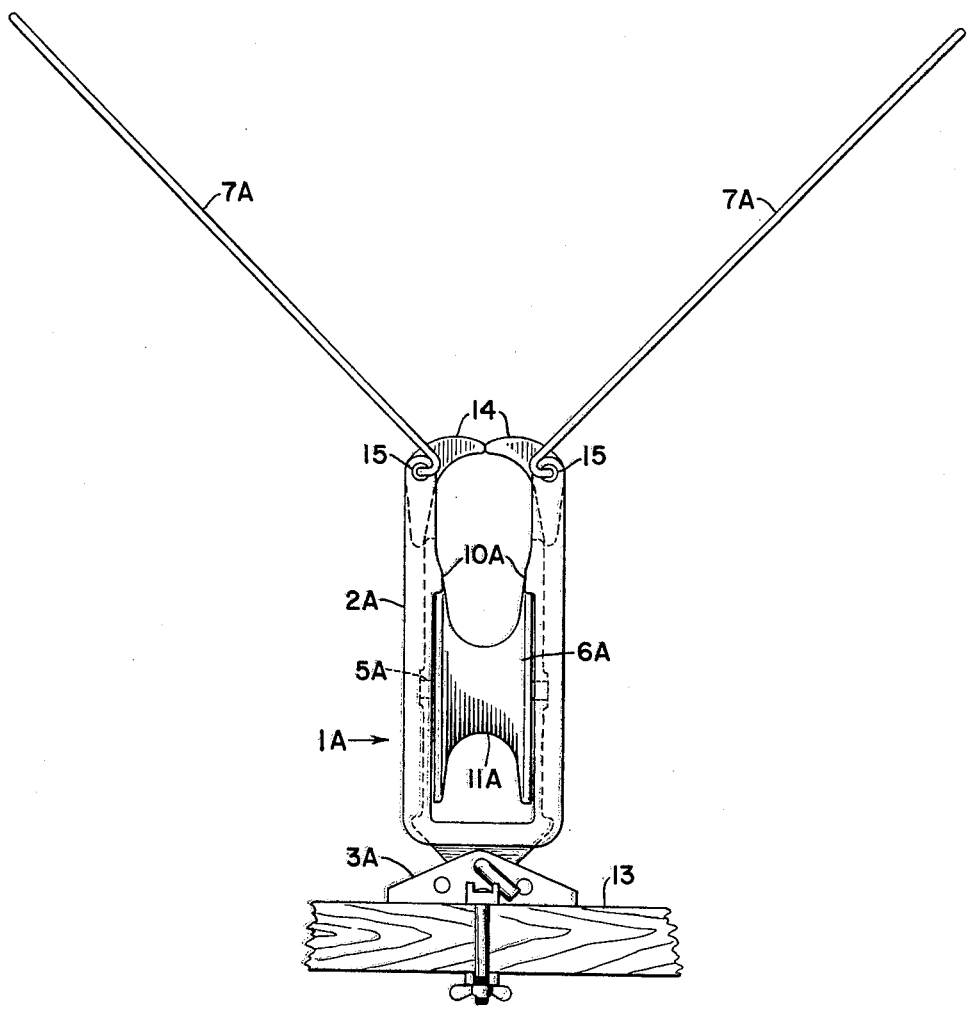
FIG. 5 is a front elevation of a modified form of my invention.

In accomplishing the purposes described above, I have provided, as shown in FIG. 1, a partially open block, generally designated at 1, having a frame 2 preferably made of metal, such as a high strength aluminum alloy, and means 3 attached to the frame for supporting the block from a support structure, not shown. In the illustration of FIG. 1, the support is a series of insulators 4, only one of which is shown.

In the frame 2, there is supported an axle pin 5 on which is rotatably mounted a grooved sheave, wheel or pulley 6. Attached to the frame 2, adjacent the upper edge of its open side, is an inclined wing or guide 7, extending at approximately a right angle to the sheave 6. This wing is preferably formed of spring metal, such as spring steel, and is in the shape of a loop or fork, in order to afford maximum strength for a given weight of metal. The outer end 8 of the wing is formed as a closed loop to avoid the possibility of entanglement of the transmission line with the outer end of the wing, which is inclined upwardly from the frame at an angle of approximately 45° to the sheave. The wing 7, as illustrated in FIG. 3, is preferably formed of metal, such as high temper steel or aluminum wire, of round cross section, thereby avoiding the possibility of scratching the transmission line as it slides across the wing. In addition, the round cross section affords considerable strength for a given weight of material.

In order further to protect the line from being scratched as it slides on the wing, the wing is preferably provided with a coating 9 of a rubbery material, such as rubber, Neoprene, or the like.

In addition, since perception of the wing from a helicopter is difficult, due to necessary distance of the helicopter from the support structure for safety and due to a limited arc of visibility below and limited perspective from the helicopter, it is desirable to enhance the visibility of the wings with a fluorescent surface and such a surface is preferably provided. The fluorescent surface makes the wing more visible and easily distinguishable from other metal parts on the pulley block and on the support tower.

The frame 2 of the block is preferably provided, in the portions of the frame adjacent the upper edges of the sheave 6 and adjacent to the wing 7, with projections, sheave guards or throat guards 10 which extend over the edges of the sheave and insure that the line will slide down the wing into the groove 11 of the sheave and not become caught between the sheave and the frame.

As shown in FIG. 4, it may be desirable to provide a stabilizing bar 12 attached to the frame 2 by which a further attachment, not shown, may be made to the support structure to hold the block with its wing at a right angle to the line and to prevent it from swinging while the transmission line is being strung into it.

Figure 6:
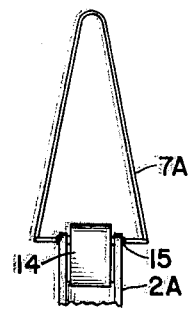
FIG. 6 is a side view, to a reduced scale, of one of the wings or guides shown in FIG. 5.

A modification of the invention is illustrated in FIGS. 5 and 6, in which a block 1A having a frame 2A is supported by an attachment means 3A so as to be upstanding from a crossarm 13 on a support tower. As in the case of the other modification, a sheave 6A, rotatably supported upon an exle pin 5A, has a peripheral groove 11A therein and the frame is provided with overhanging projections 10A to insure that the line will pass int the groove 11A. In this modification, there may be two complementary guides 7A, each guide being attached to a latch 14 pivotally mounted at 15 on each side of the frame 2A. The latches 14 face each other and cooperate, in their closed positions, to form with the frame 2A and sheave 6A an enclosure for the transmission line. The arrangement is such that the transmission line is guided into the blocks by the inclined wings 7A and, by its weight, opens one or both of the latches 14 downwardly to permit the line to enter the grove 11A of the sheave. As soon as the line passes below the latches 14, the weight of each wing 7A causes the latch 14 to be pivoted upwardly to a closed position, thereby retaining the line in the block.

As indicated above, the modification illustrated in FIGS. 5 and 6 is ordinarily positioned above a support and is customarily a small block used in stringing a conductor of relatively small diameter. The form illustrated in FIGS. 1–4 is hung below a support on a string of insulators, already described, and is more suitable for use with conductors of larger diameter.

As illustrated in FIGS. 1 and 5, the wing must be long enough to facilitate stringing of the transmission line by helicopter, the overall length of the wing being greater than the height of the block. Also, as shown in FIGS. 1, 5 and 6, the wings 7 and 7A have appreciable widths in inclined planes extending in the same longitudinal directions as the vertical planes of the grooves 11 and 11A, thereby being effective instantly to align a linear transmission line with either groove 11 or 11A.

By this invention, there is provided a block which is particularly useful in stringing electric power transmission lines, especially from the air. An inclined wing or guide provides a wide mouth of the right kind into which the line can be placed. The wing is made of spring metal arms in a looped or hairpin shape and is round in cross section to avoid the possibility of drawing the transmission line over a sharp edge. The wing is preferably covered with rubber to reduce further any likelihood of abrasion of the transmission line and it preferably has a fluorescent surface to make it more easily visible. The wing has relatively little weight, is strong for its weight and is preferably made of a spring metal, such as spring steel, in order that it may take the weight of a transmission line resiliently. The wing will bend down as the line hits it and then rebound upwardly to its normal position; it enables the transmission line to be put in place, without shock, from a helicopter. Due to the round cross section of the wing, it is of a form and shape suitable to be covered with a soft protective coating so that the line will not be damaged when it slides on the wing.

After the transmission line is strung through the block, it is brought up to the desired tension by being drawn over the rotatable sheave 6 or 6A, with a minimum amount of friction. After the line has been completely strung, the line is temporarily supported by other means, the stringing block 1 or 1A is removed and a permanent connection is put into place to support the line.

Although the invention has been described in connection with use of a helicopter, it can also be used with other means for stringing a line, e.g., a balloon, dirigible, vertical take-off (V.T.O.) plane, or by a rope line shot from a gun.

It will be apparent to those skilled in the art that various changes may be made in the invention, without departing from the spirit and scope thereof, and therefore the invention is not limited by that which is shown in the drawings and described in the specification, but only as indicated in the appended claims.

I claim:

1. In a sheave block for stringing an electric power transmission line from above, a partially open block comprising a frame supporting an axle pin, a sheave having a peripheral groove therein rotatably mounted on the pin, means for attaching the frame to a support in a substantially vertical position and an inclined wing attached to and extending upwardly from the frame for receiving the line, said wing comprising a closed loop of metal free at its outer looped end, having a round cross section, being wider than the block in a plane extending in the same longitudinal direction as the plane of the groove in the sheave and being of such a length as to extend appreciably above the top of the block.

2. A partially open pulley block comprising a frame supporting an axle pin, a sheave rotatably mounted on the pin, means for attaching the frame to a support and an inclined wing attached to and extending upwardly from the frame, said wing comprising a loop of spring metal having a round cross section and being attached to a latch pivotally supported above the sheave.

References Cited by the Examiner

UNITED STATES PATENTS

| 2,202,184 | 5/40 | Berger | 254—192 |
| 2,385,939 | 10/45 | Pollock | 254—190 |
| 2,504,005 | 4/50 | Davis | 254—190 |
| 2,613,256 | 10/52 | Thomas. | |
| 2,741,458 | 4/56 | Le Bus | 254—193 |
| 3,010,700 | 11/61 | Petersen. | |

FOREIGN PATENTS

| 126,044 | 5/19 | Great Britain. |
| 171,615 | 11/21 | Great Britain. |
| 645,245 | 6/28 | France. |

SAMUEL F. COLEMAN, *Primary Examiner.*

HARRISON R. MOSELEY, *Examiner.*